United States Patent
Akiwumi-Assani et al.

(10) Patent No.: US 7,933,411 B2
(45) Date of Patent: Apr. 26, 2011

(54) METHOD OF CONSTRUCTING MPEG PROGRAM STREAMS FROM ENCRYPTED MPEG TRANSPORT STREAMS

(75) Inventors: Samuel Olu Akiwumi-Assani, Beacon, NY (US); Richard Chi-Te. Shen, Leonia, NJ (US); Sheau-Bao Ng, Briarcliff Manor, NY (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 2531 days.

(21) Appl. No.: 10/184,518

(22) Filed: Jun. 28, 2002

(65) Prior Publication Data

US 2004/0001592 A1    Jan. 1, 2004

(51) Int. Cl.
 *H04N 7/167* (2006.01)
(52) U.S. Cl. ........................................ 380/238; 380/241
(58) Field of Classification Search .................. 380/238, 380/241
 See application file for complete search history.

(56) References Cited

U.S. PATENT DOCUMENTS

| | | | |
|---|---|---|---|
| 5,675,654 A | 10/1997 | Ryan | |
| 6,014,368 A * | 1/2000 | Sanami | 370/242 |
| 6,016,348 A | 1/2000 | Blatter et al. | |
| 6,021,199 A * | 2/2000 | Ishibashi | 380/217 |
| 6,172,988 B1 * | 1/2001 | Tiernan et al. | 370/473 |
| 6,873,629 B2 * | 3/2005 | Morris | 370/535 |
| 6,901,078 B2 * | 5/2005 | Morris | 370/466 |
| 2001/0009548 A1 | 7/2001 | Morris | |
| 2004/0136696 A1 * | 7/2004 | Shiokawa et al. | 386/98 |

FOREIGN PATENT DOCUMENTS

| | | |
|---|---|---|
| CN | 1238885 A | 12/1999 |
| CN | 1238886 A | 12/1999 |
| EP | 0 674 440 A2 | 9/1995 |
| EP | 0 969 666 A2 | 1/2000 |
| EP | 1 209 922 A2 | 5/2002 |
| JP | 10253515 | 3/2000 |
| JP | 11193625 | 1/2001 |
| WO | WO 99/07151 | 2/1999 |
| WO | WO 01/50773 A1 | 7/2001 |

OTHER PUBLICATIONS

EBU Project Group B/CA: "Functional Model Of A Conditional Access System"; 8301 EBU Review Technical (1995) Winter, No. 266, Grand-Saconnex, CH; pp. 64-77.
Angebaud, D et al: "Conditional Access Mechanisms For All-Digital Broadcast Signals"; IEEE Transactions on Consumer Electronics, vol. 38, No. 3; Aug. 1, 1992; pp. 188-194.

* cited by examiner

*Primary Examiner* — Gilberto Barron, Jr.
(74) *Attorney, Agent, or Firm* — DLA Piper LLP (US)

(57) ABSTRACT

An electronic device comprising: a transport stream analyzer, the transport stream analyzer adapted to receive an encrypted MPEG transport stream and to output a program stream map stream, a conditional access table stream, a program stream directory stream, an encrypted video signal stream, one or more encrypted audio streams, an entitlement control message stream and an entitlement management message stream, all as MPEG packetized elementary stream data structures; and a packet multiplexer adapted to receive the output of the transport stream analyzer and to assemble the output of the transport stream analyzer into an encrypted MPEG compliant modified program stream comprised of packs of MPEG packetized elementary stream data structures and to output the encrypted MPEG compliant modified program stream.

22 Claims, 10 Drawing Sheets

METHOD OF CONSTRUCTING MPEG PROGRAM STREAMS FROM ENCRYPTED MPEG TRANSPORT STREAMS

FIELD OF THE INVENTION

The present invention relates to the field of MPEG-2 program streams; more specifically, it relates to a method for constructing an encrypted MPEG-2 compliant program stream from an encrypted MPEG-2 transport stream and an apparatus for creating, storing and playing the encrypted MPEG-2 compliant program stream.

BACKGROUND OF THE INVENTION

The Motion Pictures Experts Group-2 (MPEG-2) standard is used to supply a stream of digital data to digital receivers such as set-top boxes (STB) and digital television (DTV). The digital data takes two forms. One form of the digital data stream is called a transport stream (TS) and is intended to carry multiple programs. The other form of the digital data stream is called a program stream (PS) and is intended to carry one program. The MPEG-2 standard also allows conditional access (CA) of the program content by providing mechanisms to support the use of proprietary encryption and access functions. These mechanisms are defined only for transport streams.

Digital receiver units receive MPEG-2 transport streams and allow selection and play of programs. Digital receiver units may also receive program streams (PS) from storage devices. MPEG-2 program streams contain one program. Receiver units equipped with storage subsystems further allow recording of programs for playback at a later time.

For programs delivered as a transport stream, MPEG-2 fully specifies the encrypted data structure to allow a service provider to enforce conditional access on any program in the stream. Unfortunately, MPEG-2 does not fully specify the encrypted data structure for a program stream. Rather, it is left to the storage subsystem of the receiver to provide conditional access control. Consequently, receiver manufacturers are presented with the problem of efficiently implementing features such as selective single program recording with conditional access control on the recorded program.

Currently, three approaches to the problem of selective recording of programs while preserving conditional access exist. The first approach is to store the entire MPEG-2 transport stream. However, the first approach requires large amounts of storage, especially for services that supply large numbers of programs in a single transport stream.

The second approach is to decrypt the program of interest and then store the decrypted program in a receiver manufacturer proprietary format. However, the second approach takes the control away from the service provider and may not supply a sufficiently robust encryption.

The third approach is to decrypt the program of interest and store the program in the "clear," that is, in an unencrypted format. However, the third approach may not be acceptable to the service provider or the owner of the copyright of the program being thus recorded.

SUMMARY OF THE INVENTION

A first aspect of the present invention is an electronic device comprising: a transport stream analyzer, the transport stream analyzer adapted to receive an encrypted MPEG transport stream and to output a program stream map stream, a conditional access table stream, a program stream directory stream, an encrypted video signal stream, one or more encrypted audio streams, an entitlement control message stream and an entitlement management message stream, all as individual MPEG packetized elementary stream data structures; and a packet multiplexer adapted to receive the output of the transport stream analyzer and to assemble the output of the transport stream analyzer into an encrypted MPEG compliant modified program stream comprised of packs of MPEG packetized elementary stream data structures and to output the encrypted MPEG compliant modified program stream.

A second aspect of the present invention is a receiver for an encrypted MPEG transport stream, comprising: a transport stream de-multiplexer and decryptor adapted to receive the encrypted MPEG transport stream, the transport stream de-multiplexer and decryptor further adapted to convert the encrypted MPEG transport stream into a first video elementary stream and a first audio elementary stream, the first video elementary stream and the first audio elementary stream being received by an audio and video decoder and presenter, the audio and video decoder and presenter adapted to output a playable signal based on the first video and audio elementary streams; a program stream constructor adapted to receive the encrypted MPEG transport stream, the program stream constructor further adapted to construct and to output an encrypted MPEG compliant modified program stream from the encrypted MPEG transport stream, the encrypted MPEG compliant modified program stream comprised of packs of MPEG packetized elementary stream data structures; a storage subsystem adapted to store the encrypted MPEG compliant modified program stream; and a program stream de-multiplexer and decryptor adapted to retrieve the encrypted MPEG compliant modified program stream, the program stream de-multiplexer and decryptor further adapted to convert the encrypted MPEG compliant modified program stream into a second video elementary stream and a second audio elementary stream, the second video elementary stream and the second audio elementary stream being received by the audio and video decoder and presenter further adapted to output the playable signal based on the second video and audio elementary streams.

A third aspect of the present invention is a method for creating an MPEG program stream comprising: extracting a program map table from an encrypted MPEG transport stream and creating a program stream map stream in an MPEG packetized elementary stream data structure; extracting a conditional access table from the encrypted MPEG transport stream and creating a conditional access stream in the MPEG packetized elementary stream data structure; extracting a program stream directory from the encrypted MPEG transport stream and creating a program stream directory stream in the MPEG packetized elementary stream data structure; determining the packet IDs of all transport stream packets of a single selected program; extracting an entitlement management message from the encrypted MPEG transport stream and creating an entitlement management message stream in the MPEG packetized elementary stream data structure; after creating the entitlement management message stream, extracting and selecting from the encrypted MPEG transport stream video packets, packets from one or more audio channel and an entitlement control message, the video packets, the one or more audio channel packets and the entitlement control message packet having packet IDs belonging to the single selected program and creating respectively from the selected video, audio channel, entitlement control message into an encrypted video stream, one or more encrypted audio channel streams and an entitlement control message stream in separate MPEG packetized elementary stream data structures, each MPEG packetized elementary stream data structure containing only one stream type and each audio MPEG packetized elementary stream data structure containing only one audio channel; and assembling the program stream map stream, the conditional access table stream, the program stream directory, the entitlement management message stream, the encrypted video stream, the encrypted audio channel streams and the entitlement control message stream into an encrypted MPEG compliant modified program stream.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

The term and data structures of MPEG-2 are used in describing the present invention. It should be understood that the term MPEG-2 may be replaced by MPEG-1, MPEG-4, MPEG-7, digital satellite system (DSS) data structures or other standards that share common data stream structures with or are built upon the MPEG-2 standard. Further, the term MPEG is intended to cover all these aforementioned standards.

Figure 1:
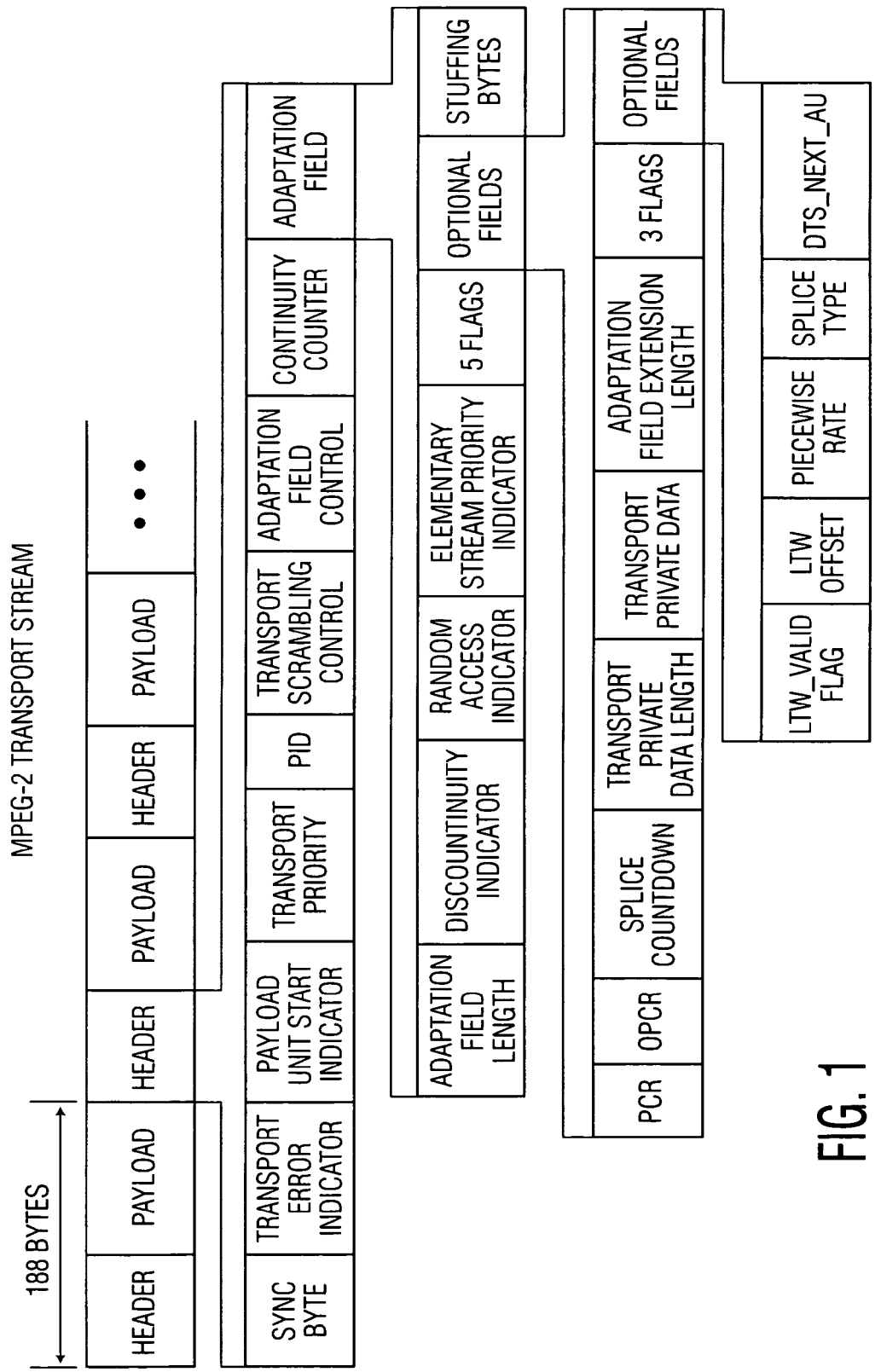
FIG. 1 is a schematic diagram of the data structure of an MPEG-2 transport stream.
Figure 2:
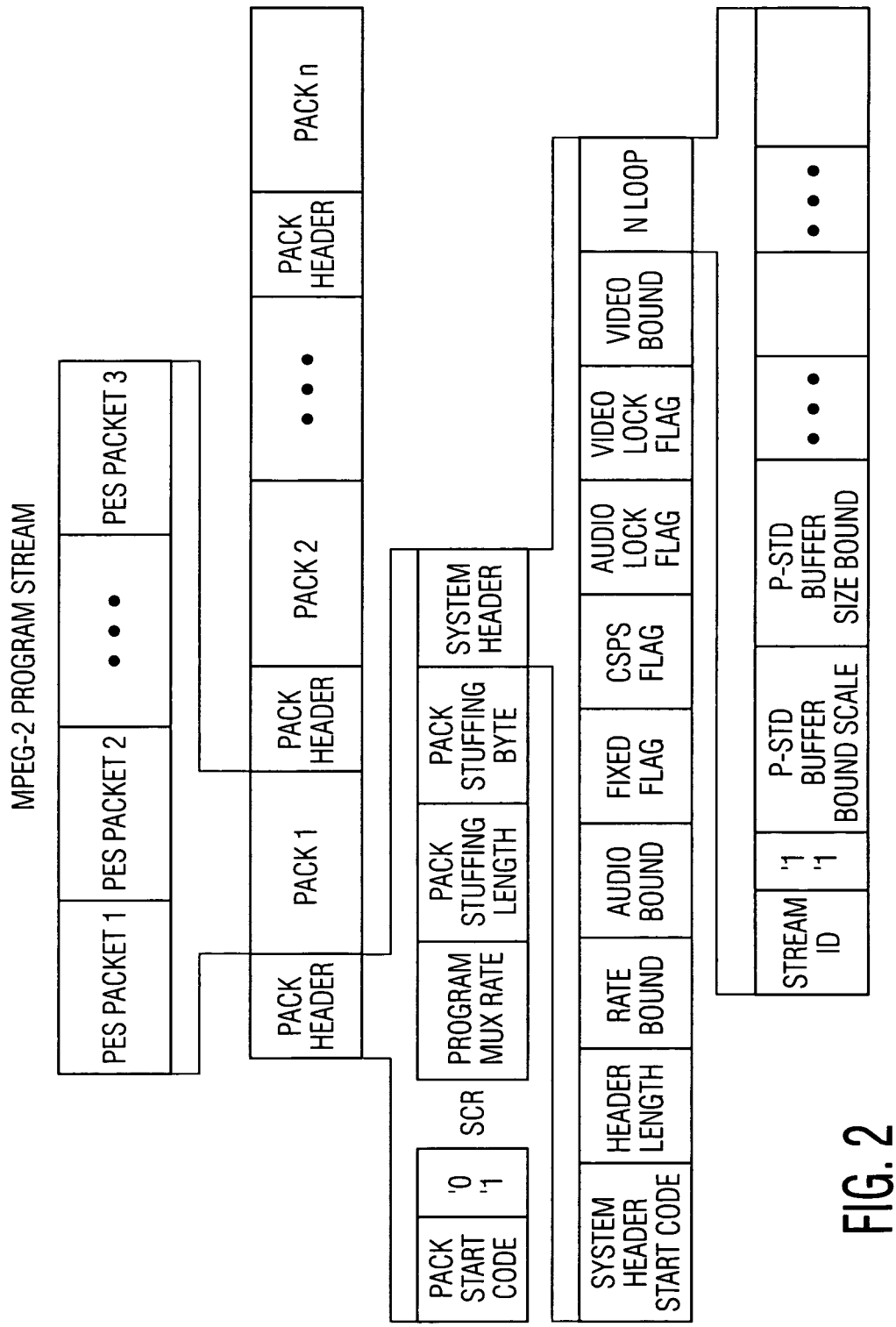
FIG. 2 is a schematic diagram of the data structure of an MPEG-2 program stream.
Figure 3:
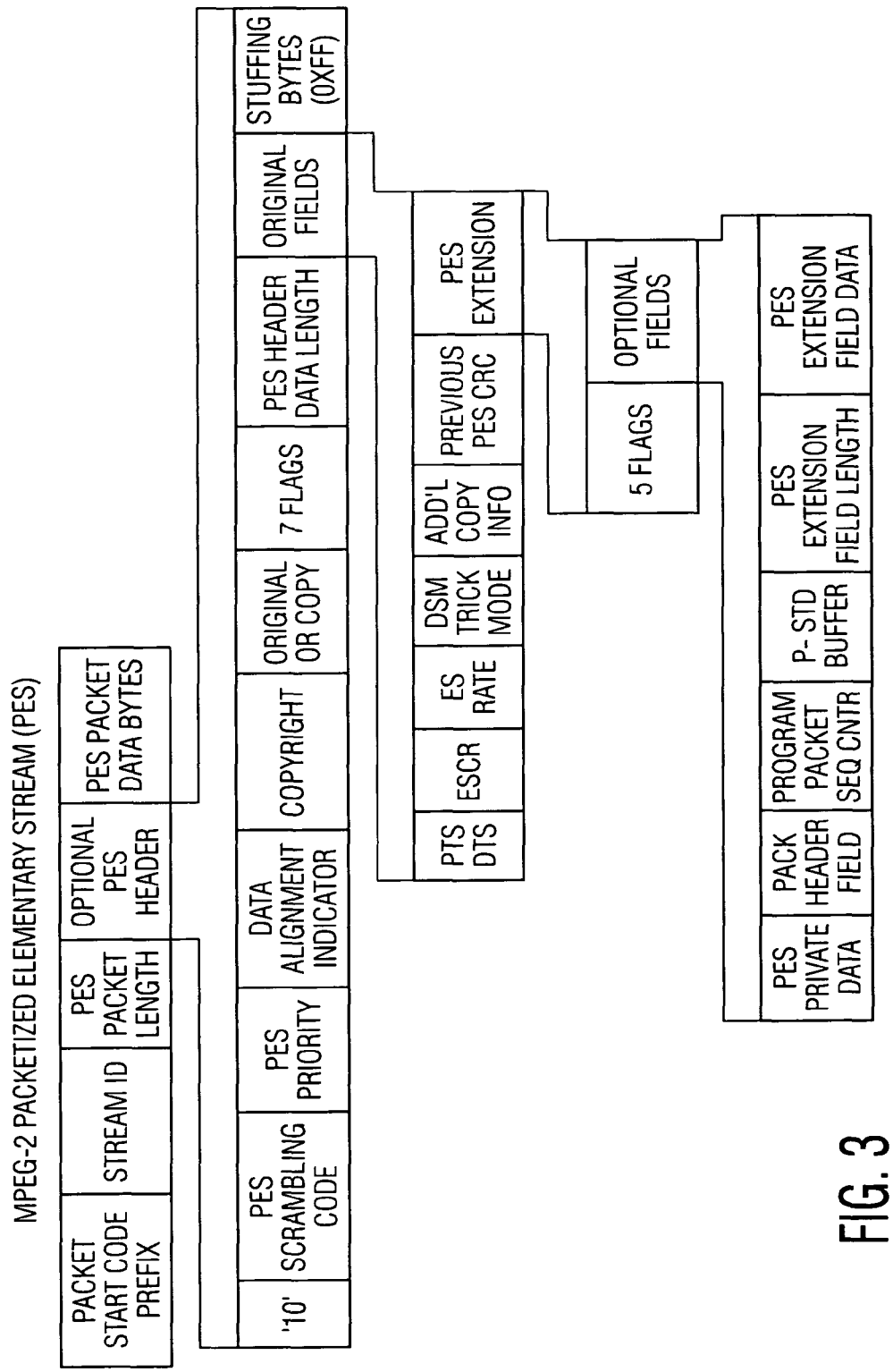
FIG. 3 is a schematic diagram of the data structure of an MPEG-2 packetized elementary stream.

FIGS. 1 through 3 are provided as an aid to understanding the present invention and merely illustrate the MPEG-2 standard digital data stream structure.

FIG. 1 is a schematic diagram of the data structure of an MPEG-2 transport stream. A transport stream carries multiple programs. A transport stream is comprised of multiple 188 byte units, each which includes a header and a payload. Headers are divided into the following fields: a sync byte field, a transport error indicator field, a payload unit start indicator field, a transport priority field, a packet ID (PID) field, a transport scrambling control field, an adaptation field control field, a continuity counter field and adaptation field. The payload unit start indicator field and the PID field and the transport scrambling control field are of especial interest for the present invention.

The adaptation field is further divided into the following fields: an adaptation field length field, a discontinuity counter field, a random access indicator field, an elementary stream priority indicator field, a field of 5 flags pointing to an optional fields field and a stuffing bytes field.

The optional fields field is further divided into a program clock reference (PCR) field, a old program clock reference field (OPCR), a splice counter field, a transport private data length field, a transport private data field, an adaptation field extension length field and a field of three flags pointing to an optional fields field. The PCR field is of especial interest for the present invention.

The optional fields field is further divided into fields as illustrated in FIG. 1

Each payload generally contains data in the form of pieces of packetized elementary streams (PES). However, data in other data formats may be packed into a payload. Video, audio, entitlement management message and entitlement control message data is always packed in PES format. The data structure of an MPEG-2 PES stream is illustrated in FIG. 3 and described infra.

FIG. 2 is a schematic diagram of the data structure of an MPEG-2 program stream. A program stream is a variable length structure composed of multiple packs, each pack is divided into a pack header and one or more PES packets. A program stream carries only one program. The data structure of an MPEG-2 PES stream is illustrated in FIG. 3 and described infra. Pack headers are divided in the following fields: a pack start code field, a "01" field, a system clock reference (SCR) field, a program MUX rate field, a pack stuffing length field, a pack stuffing byte field and a system header field. The SCR and program MUX rate fields are of especial interest for the present invention.

The system header field is further divided into a system header start code field, a header length field, a rate bound field, an audio bound field, a fixed flag field, a CSPS flag field, an audio lock flag field, a video lock flag field, a video bound field and an N loop field.

The N loop field is further divided into a stream ID field, a "11" field, a P-std buffer bound scale field, a P-std buffer size bound field, and other fields. The stream ID field is of especial interest for the present invention.

FIG. 3 is a schematic diagram of the data structure of an MPEG-2 packetized elementary stream (PES). A PES stream is a variable length structure composed of a packet start code prefix field, a stream ID field, a PES packet length field, an optional PES header field and a field for the actual PES packet data. Again the stream ID is of especial interest to the present invention. The optional PES header field is divided and subdivided as illustrated in FIG. 3.

Figure 4:
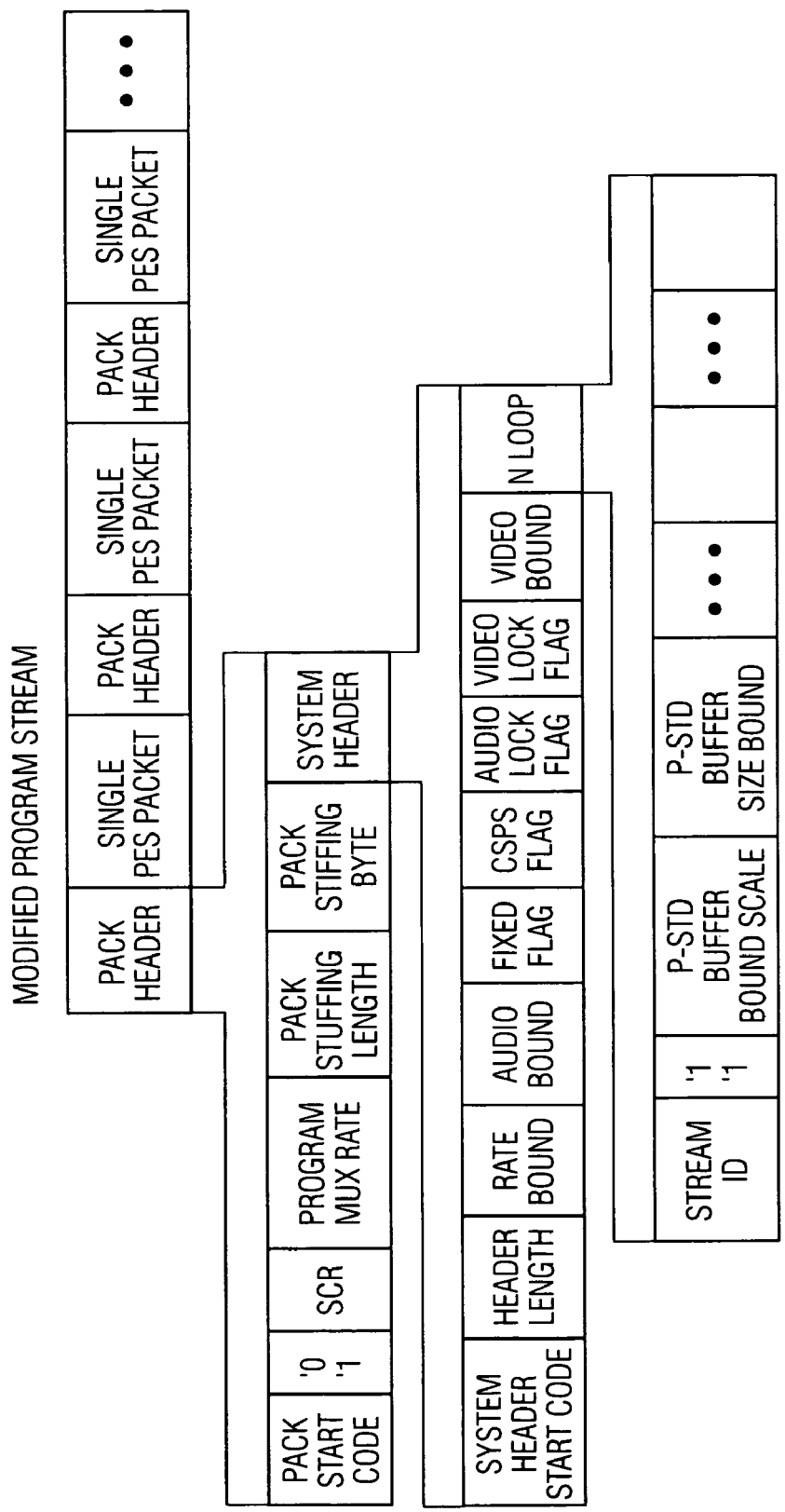
FIG. 4 is a modified MPEG-2 program stream according to the present invention.

FIG. 4 is a modified MPEG-2 program stream according to the present invention. The modified program stream illustrated in FIG. 4 is similar to the program stream illustrated in FIG. 2 and described supra with the exception that pack fields in the modified program stream contains one and only one PES packet as opposed to multiple PES packets. The reason for placing one PES packet in a pack is to preserve the separation of the encrypted video PES and encrypted audio PES— thereby avoiding the need to first decrypt before constructing the program stream. The modified program stream is an MPEG-2 compliant stream.

Figure 5:
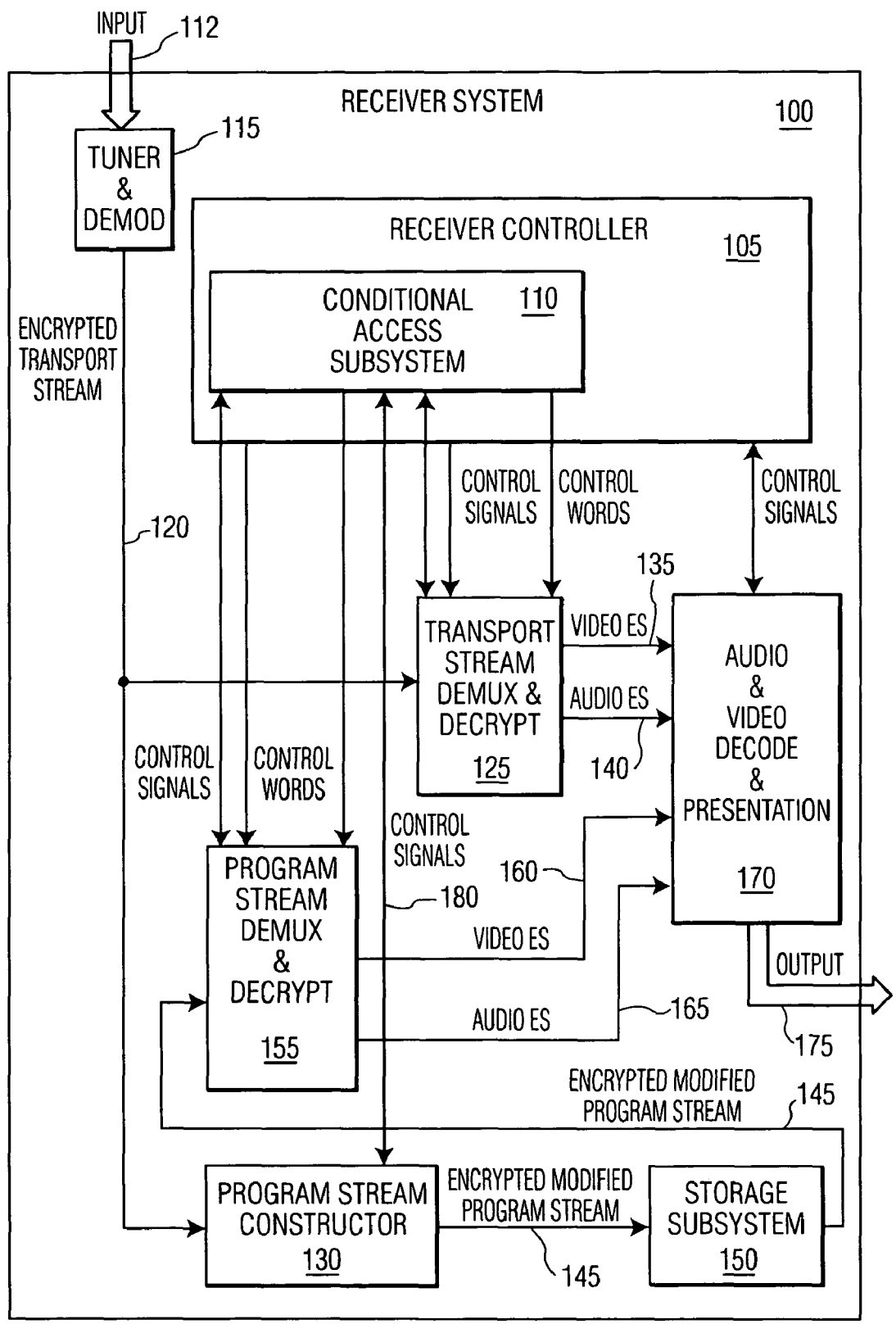
FIG. 5 is a schematic block diagram of a receiver for creating and playing modified MPEG-2 program streams according to the present invention.

Turning to the hardware to construct the modified program stream illustrated in FIG. 4 and described supra, FIG. 5 is a schematic block diagram of a receiver for creating and playing modified MPEG-2 program streams according to the present invention. In FIG. 5, receiver 100 includes a receiver controller 105 containing a conditional access subsystem 110 and a tuner and demodulator 115 for receiving an encrypted MPEG-2 digital data stream 112 provided by a service provider and passing an encrypted transport stream 120 to a transport stream de-multiplexer and decryptor 125 and a program stream constructor 130. Conditional access subsystem 110 includes the functions for providing decryption support to transport stream de-multiplexer and decryptor 125 and to program stream de-multiplexer and decryptor 155. Transport stream de-multiplexer and decryptor 125 converts encrypted transport stream 120 into a first video elementary stream (ES) 135 and a first audio ES stream 140.

Program stream constructor 130 converts encrypted transport stream 120 into an encrypted modified program stream 145 as illustrated in FIG. 4 and described supra. Program stream constructor 130 creates modified program stream 145 without actually decrypting transport stream 120. Modified program stream 145 is stored in a storage subsystem for play back later. Storage subsystem 150 may comprise storage media such as hard disks, re-writable CD drives, re-writable DVD drives, semiconductor storage or even tape.

For play back, a program stream de-multiplexer and decryptor 155 reads encrypted modified program stream 145 from storage subsystem 150 and converts the encrypted modified program stream into a second video ES stream 160 and a second audio ES stream 165.

An audio and video decoder 170 receives first or second video ES streams 135 or 160 and first or second audio ES streams 140 or 165 and converts them to playable output 175 suitable for use by normal television, audio and/or computer equipment.

A variety of control signals and control words are sent from receiver controller 105 and conditional access subsystem 110 to various components of receiver 100. Of particular note are control signals 180 sent between receiver controller 105 and program stream constructor 130.

Figure 6:
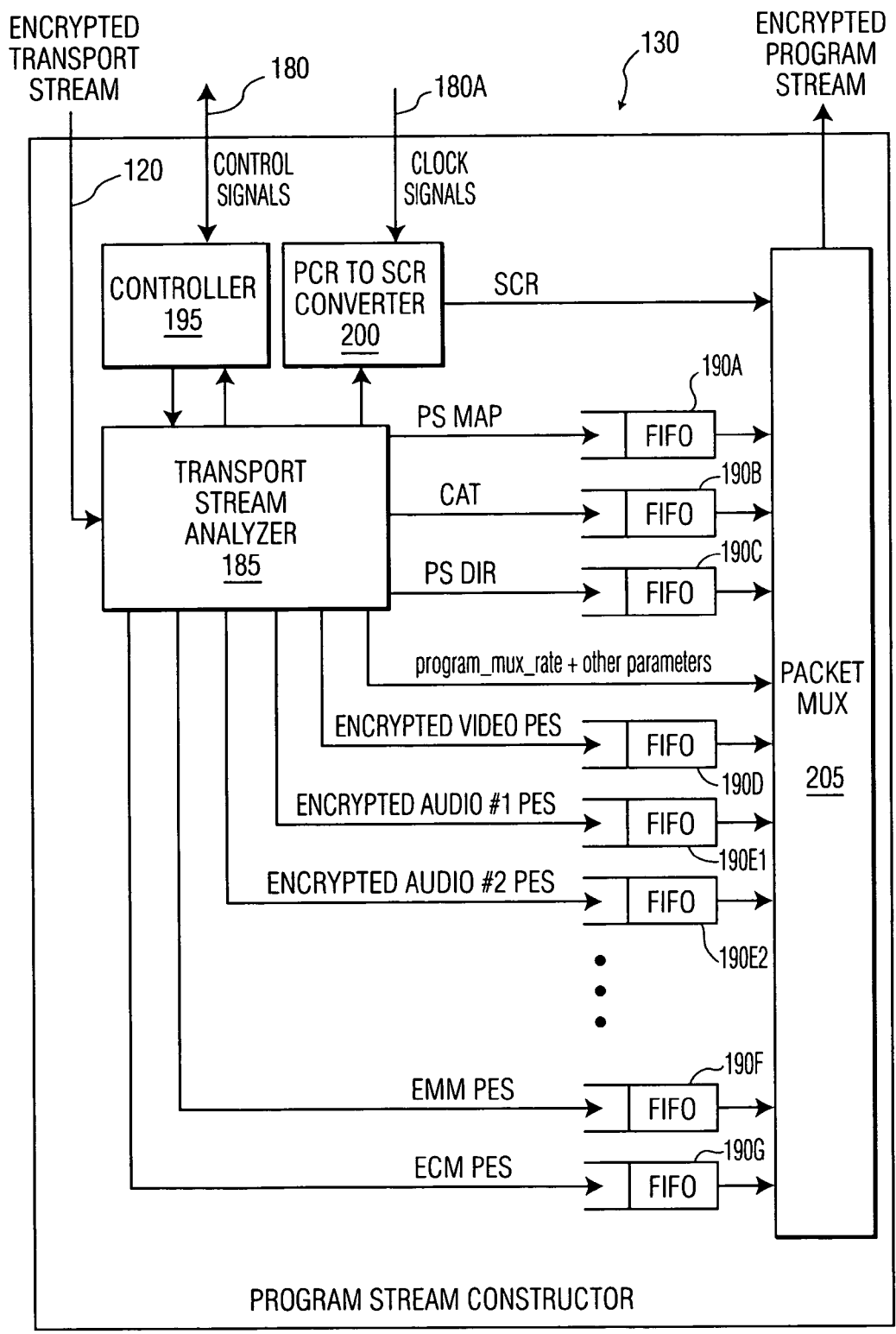
FIG. 6 is a schematic block diagram of the program stream constructor of FIG. 5.

FIG. 6 is a schematic block diagram of program stream constructor 130 of FIG. 5. In FIG. 6, program stream constructor 130 includes a transport stream analyzer 185 for selecting and converting selected contents of encrypted transport stream 120 into PES unit streams that are stored in first-in-first-out (FIFO) buffers 190A through 190G. Each FIFO buffer 190A through 190G may contain multiple PES units, but each FIFO buffer 190A through 190G may contain only one type of PES unit as is described infra. The contents of FIFO buffers 190A through 190G are combined by a packet multiplexer to form encrypted modified program stream 145 (see FIG. 5). FIFO buffers 190A through 190G are capable of being allocated dynamically depending upon the size and number of PES units at any given moment. Program stream constructor 130 further includes a controller 195 and a PCR to SCR converter 200.

Transport stream analyzer 185 locates and extracts from encrypted transport stream 120 the program association table (PAT) in PID 0, which points to the PID that carries the program map table (PMT). PID 0 is always clear (not encrypted). The PMT allows determination of the video, audio and entitlement control messages (ECMs) PIDs for the program set (the program selected to be stored). ECMs control program decryption.

Transport stream analyzer 185 further locates and extracts from encrypted transport stream 120 the conditional access table (CAT) in PID 1, which points to the PID that carries the entitlement management message (EMM) that controls program access.

Transport stream analyzer 185 also detects for each PID when the transport stream payload starts at the beginning of an alignment boundary, that is, detects when the payload_unit-start field of transport stream packets (see FIG. 1) is true for each PID in the program set as well as detects the program clock reference (PCR) instantly sending it to the PCR to SCR converter 200. Therefore, each of FIFO buffers 190A through 190G includes means to indicate whether it contains at least one PES unit, and if it contains multiple PES units, to denote the boundary of each PES unit.

Two other functions of transport stream analyzer 185 are to determine when the first EMM unit is detected in encrypted transport stream 120 and to calculate the average aggregate stream rate (program_mux_rate), based on all transport stream packets for the set of PIDs. The transport stream analyzer 185 also passes various other parameters normally required and well known to those skilled in the art, for constructing a program stream, to the packet mux 205 for constructing the encrypted modified program stream 145.

Transport stream analyzer 185 sends each new PCR to PCR to SCR converter 200 which based on clock signal 180A (see FIG. 6) from receiver controller 105 (see FIG. 5), creates a new SCR based on the time delay between when the latest PCR was received and the SCR was needed, which is inputted to a packet MUX 205. Transport stream analyzer 185 transforms the PMT into a PS map, encapsulates the PS map as a PES and stores the PS map in FIFO buffer 190k Transport stream analyzer 185 encapsulates the CAT as a PES with stream_type=private_data and stores the CAT in FIFO buffer 190B. Transport stream analyzer 185 polls receiver controller 105 (see FIG. 5) and encapsullates the PS DIR as a PES and stores the PS DIR in FIFO buffer 190C. After transport stream analyzer 185 calculates the program_mux_rate, the program_mux_rate is inputted to packet multiplexer 205. Transport stream analyzer 185 stores the encrypted video PESs in FIFO buffer 190D, the encrypted audio PESs in FIFO buffers 190E1, 190E2 etc., the EMM PES in FIFO buffer 190F and the ECM PES in FIFO buffer 190G.

Packet multiplexer 205 takes input from a variable set of FIFO buffers 190A through 190G, each containing at least one PES unit as well as the SCR and program_mux_rate, plus the other parameters described supra, from the transport stream analyzer 185. A FIFO buffer containing at least one PES unit is defined as a ready buffer. Packet multiplexer 205 implements a policy in which all ready buffers are serviced in a manner such that no FIFO buffer ever overflows and so transit delay for each PES is minimized. In one example, FIFO buffers are serviced in a pre-determined sequence. When a FIFO buffer is ready to be serviced, its PES units are encapsulated into pack structure (see FIG. 4). Only one FIFO buffer is encapsulated at a time. The resultant modified program stream is a multiplex of packs, each pack containing only one stream type, be it a PS map, CAT, PS dir, Video, Audio, EMM or ECM type. Each time a pack is created the latest adjusted PCR value is inserted in place of the SCR field in the pack header and the calculated value of the stream aggregate rate is placed into the field program_mux_rate in the pack header (see FIG. 4). The stream_id field of the program stream system header (see FIG. 2) is set to the value of the stream_id in the program stream header of the selected program using the value determined from the PMT (or program specific information protocol stream (PSIP) in the case of advanced television selection committee (ATSC)) themselves.

Figure 7:
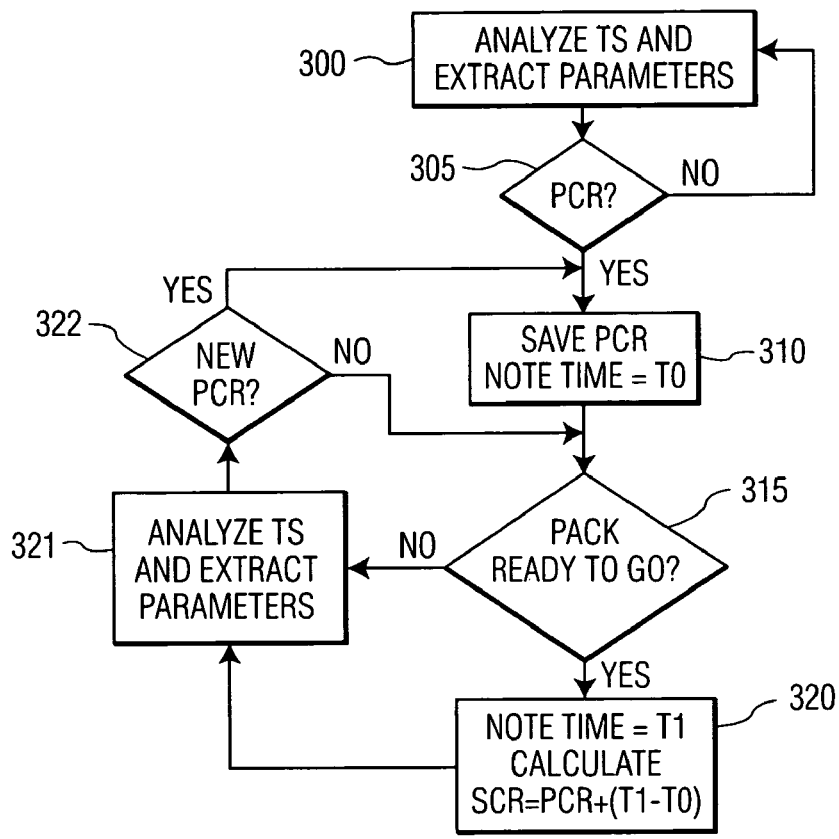
FIG. 7 is a flow diagram illustrating the method steps of converting a program clock reference to a system clock reference according to the present invention.

FIG. 7 is a flow diagram illustrating the method steps of converting a program clock reference to a system clock reference according to the present invention. In step 300, the transport stream is continuously analyzed and relevant parameters extracted as the transport stream is received. These parameters include PCRs, PMTs, CATs, EMMs, ECMs, PIDs and payload_unit_starts. In step 305, a determination is made if the extracted parameter is a PCR. If the extracted parameter is not a PCR, then steps 300 and 305 are repeated until a PCR is detected. If the extracted parameter is a PCR, then in step 310, the value of the PCR is saved and the current value of the receiver internal clock time is saved as T0. In step 315 a determination is made if a program stream pack is ready, if not, the method proceeds to step 321. If a program stream pack is ready, then, in step 320, the current value of the receiver internal clock time is saved as T1, and an SCR value is calculated as SCR=PCR+(T1−T0) and placed in the SCR field of the pack header of the program stream pack (see FIG. 4). The method then proceeds to step 321. In step 321, the transport stream is continuously analyzed and relevant parameters extracted as the transport stream is received. In step 322, it is determined if the extracted parameter is a PCR different from the PCR previously saved in step 310. If the PCR is the same then the method loops to step 315, otherwise the method loops to step 310.

Figure 8:
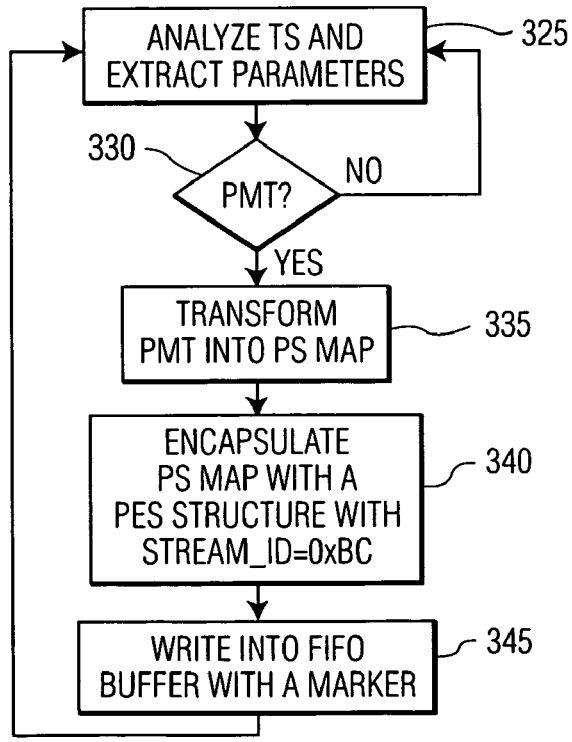
FIG. 8 is a flow diagram illustrating the method steps of converting a program map table to a program stream map according to the present invention.

FIG. 8 is a flow diagram illustrating the method steps of converting a program map table to a program stream map according to the present invention. In step 325, the transport stream is continuously analyzed and relevant parameters extracted identically as in step 300 of FIG. 7. In step 330, a determination is made if the extracted parameter is a PMT. If the extracted parameter is not a PMT, steps 325 and 330 are repeated until a PMT is detected. If the extracted parameter is a PMT, then in step 335 the PMT is transformed into a PS map. The PMT is also stored for future reference. In step 340 the PS map is encapsulated in a PES structure and the stream_id field of the pack header of the transport stream pack (see FIG. 4) is set to 0×BC. In step 345, the PES is written into a FIFO buffer with a marker. The method then returns to step 325 and repeats continuously.

Figure 9:
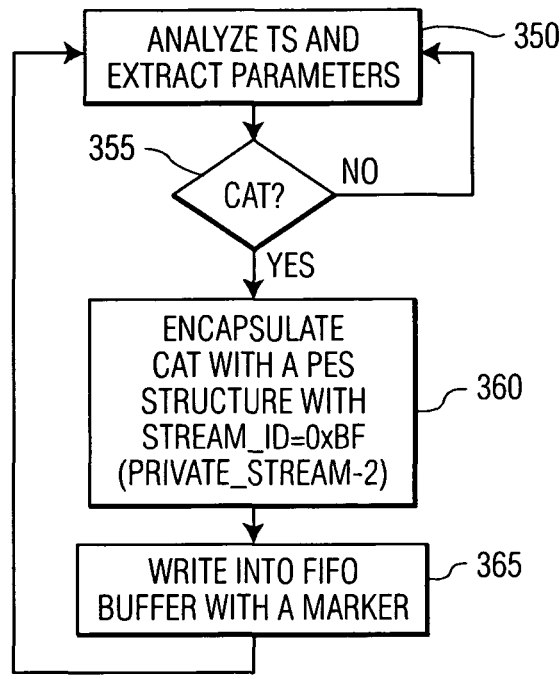
FIG. 9 is a flow diagram illustrating the method steps of extracting the conditional access table from a transport stream according to the present invention.

FIG. 9 is a flow diagram illustrating the method steps of extracting the conditional access table from a transport stream according to the present invention. In step 350, the transport stream is continuously analyzed and relevant parameters extracted identically as in step 300 of FIG. 7. In step 355, a determination is made if the extracted parameter is a CAT. If the extracted parameter is not a CAT, steps 350 and 355 are repeated until a CAT is detected. If the extracted parameter is a CAT, then in step 360, the CAT is encapsulated in a PES structure and the stream_id field of the PES header (see FIG. 3) is set to 0×BF (which is read as private_stream_2). In step 365, the PES is written into a FIFO buffer with a marker. The method then returns to step 350 and repeats continuously.

Figure 10:
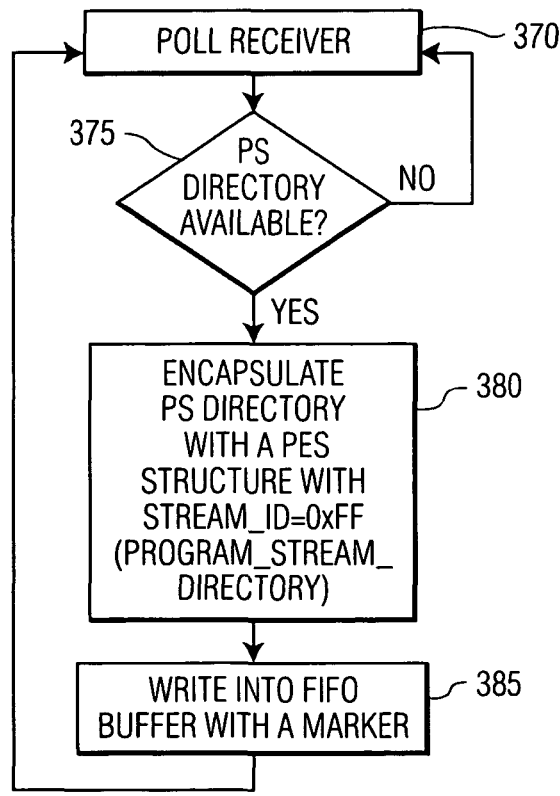
FIG. 10 is a flow diagram illustrating the method steps of extracting a program stream directory from a transport stream according to the present invention.

FIG. 10 is a flow diagram illustrating the method steps of extracting a program stream directory from a transport stream according to the present invention. In step 370, the receiver is polled for a PS directory. (The receiver extracts the PS directory from the transport stream). In step 375, a determination is made if a PS directory is available. If a PS directory is not available, steps 370 and 375 are repeated until a PS directory is available. Then in step 380, the PS directory is encapsulated in a PES structure and the stream_id field of the pack header of the PES (see FIG. 3) is set to 0×FF (which is read as. program_stream_directory). In step 385, the transport stream pack is written into a FIFO buffer with a marker. The method then returns to step 370 and repeats continuously.

Figure 11:
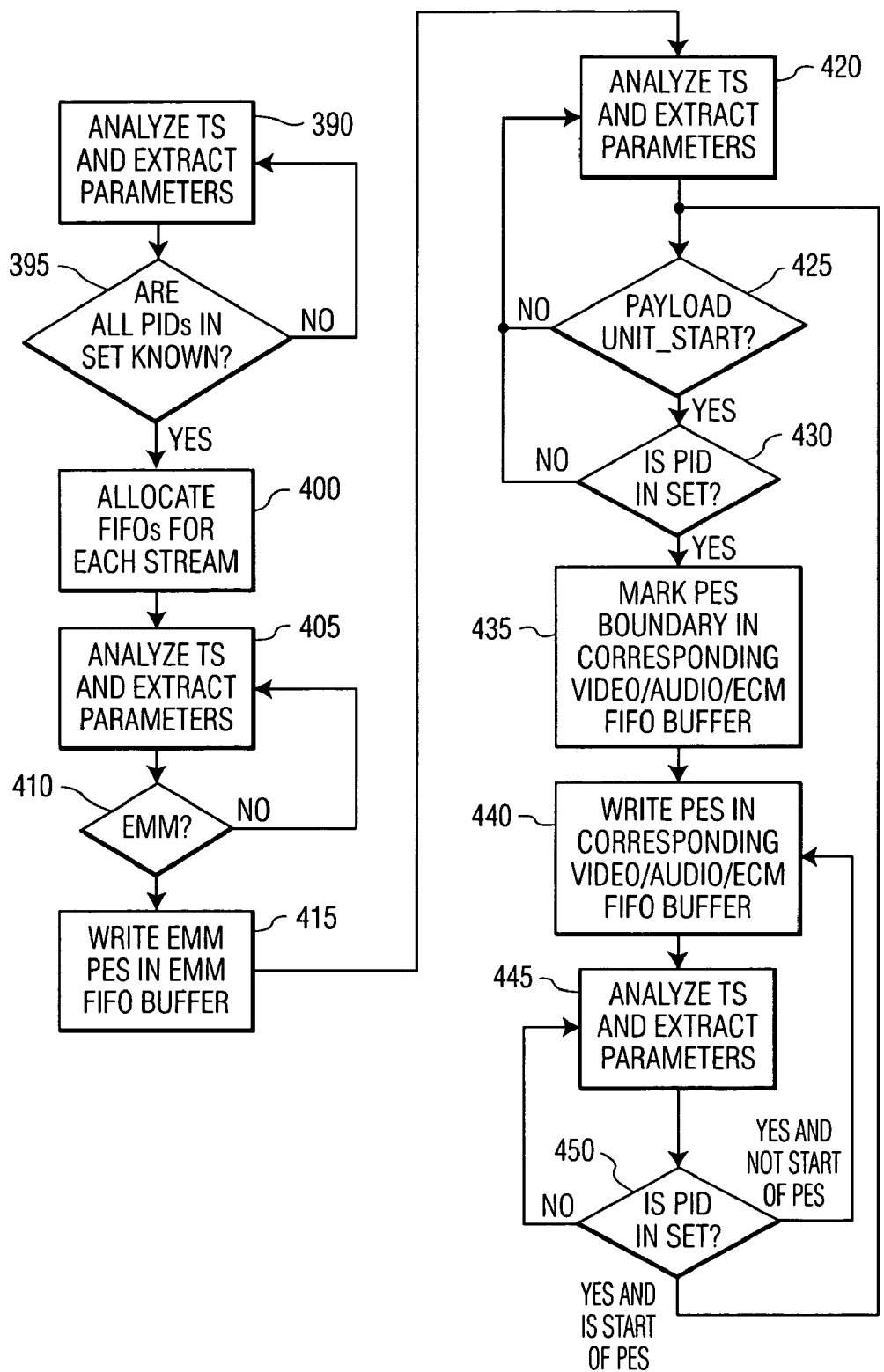
FIG. 11 is a flow diagram illustrating the method steps of extracting entitlement management messages, entitlement control messages, video PESs and Audio PESs from a transport stream according to the present invention.

FIG. 11 is a flow diagram illustrating the method steps of extracting entitlement management messages, entitlement control messages, video PESs and Audio PESs from a transport stream according to the present invention. In step 390, the transport stream is continuously analyzed and relevant parameters extracted identically as in step 300 of FIG. 7. In step 395, a determination is made if PIDs for all video, audio, ECM and EMM in the program set are known. The set of PIDs is based upon the selected program number and the contents of the PAT, CAT and PMT (or PSIP for ATSC). If all the PIDs are not known, steps 390 and 395 are repeated until all the PIDs in the program set are known. If all the PIDs are known, then in step 400, a FIFO buffer is allocated for each PID stream (i.e. EMM, video, multiple audio, ECM).

In step 405, the transport stream is continuously analyzed and relevant parameters extracted identically as in step 300 of FIG. 7. In step 410, a determination is made if the extracted parameter is an EMM. If the extracted parameter is not an EMM, steps 405 and 410 are repeated until an EMM is detected. If the extracted parameter is an EMM, then in step 415 the EMM PES structure is stored in the EMM allocated FIFO buffer.

Next, in step 420, the transport stream is continuously analyzed and relevant parameters extracted identically as in step 300 of FIG. 7. In steps 425 and 430 it is determined if the extracted parameter is a payload_unit_start indicator of a payload in the transport stream of a PES with a PID in the selected program set. If the parameter is not a payload_unit_start indicator or if it is but not for a PID of the selected program, steps 420, 425 and 430 are repeated until both conditions are met.

Next in step 435 the PES boundary is marked in the corresponding allocated FIFO buffer and in step 440, the PES packet is written into the corresponding allocated FIFO buffer.

Next, in step 445, the transport stream is continuously analyzed and additional PIDs extracted. In step 450 three possible routes are possible. If the extracted parameter is a PID that is not in the selected program set, then step 445 is repeated. If the extracted parameter is a PID that is in the selected program set but is not the start of a PES, then the method loops back to step 440 and the corresponding PES written into the FIFO buffer after PESs already stored, if any. If the extracted parameter is a PID in the selected program set and is the start of a PES, then the method loops back to step 425. Steps 420 through 450 continuously repeat.

It should be understood that the transport stream is constantly being analyzed and parameters extracted. Depending upon the type and/or value of the extracted parameter, one or more of the flows illustrated in FIGS. 7 through 11 are activated.

Figure 12:
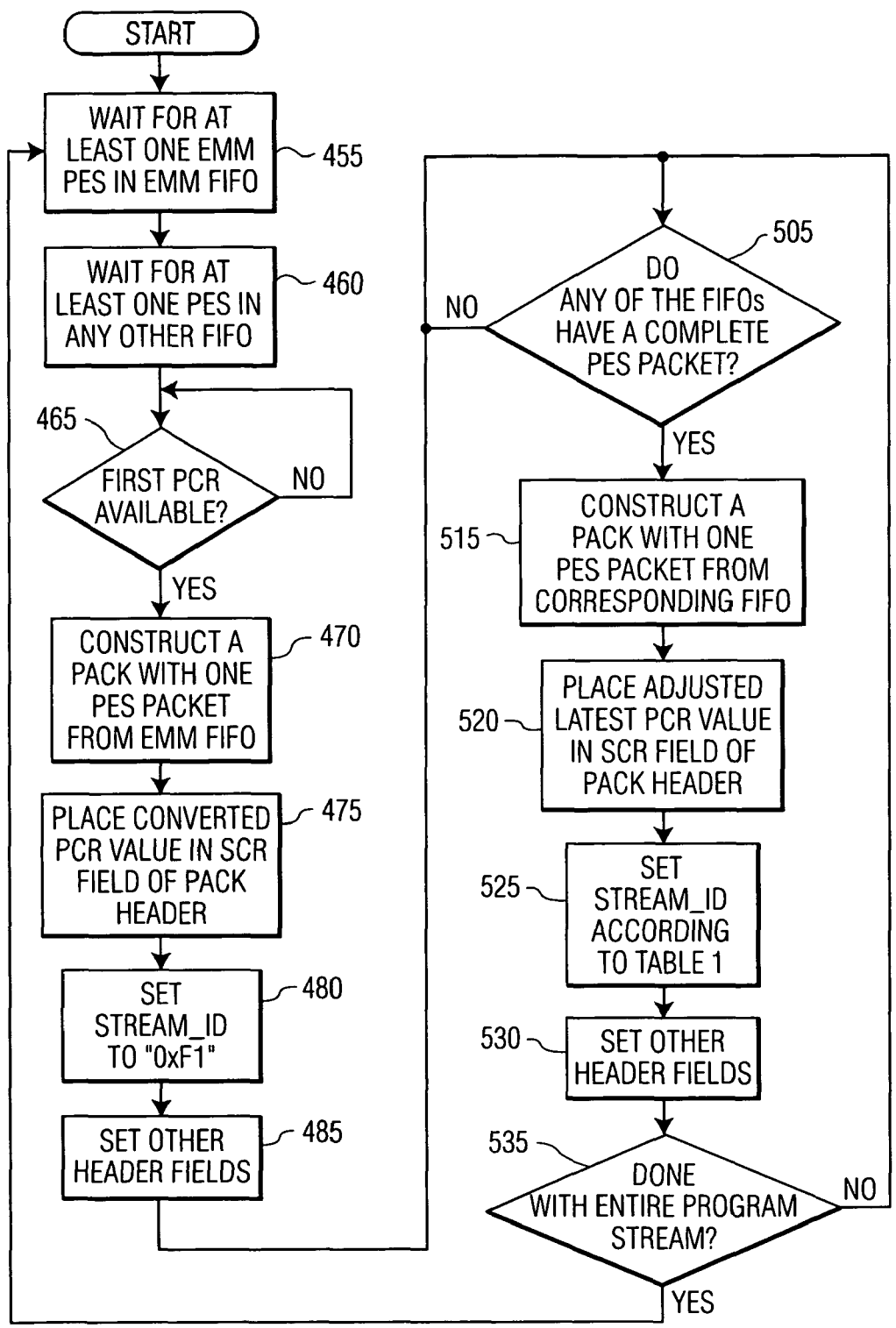
FIG. 12 is flow diagram illustrating the method steps of creating a modified transport stream according to the present invention.

FIG. 12 is flow diagram illustrating the method steps of creating a modified transport stream according to the present invention. FIG. 12 essentially describes the operation of packet multiplexer 205 illustrated in FIG. 6 and described supra. In step 455, creation of a modified transport stream is first gated by the whether or not an EMM PES is in the EMM FIFO buffer. In step 460, creation of a modified transport stream is next gated by the whether or not at least one PES packet is present in any non-EMM FIFO buffer. Under the conditions of at least an EMM PES and one other type PES, the method proceeds to step 465.

In step 465 it is determined if the first PCR has been observed. If a PCR is has been observed in step 465, then in step 470, a pack for a modified transport stream (see FIG. 4) is constructed with one PES packet from the EMM FIFO buffer. In step 475, the converted PCR value (see FIG. 6) is placed in the SCR field of the pack header. In step 480, the stream_id in the pack header is set to 0xF1 and in step 485, other header fields are set appropriately. The method then continues to step 505.

If a first PCR has not been observed, then step 465 is repeated until a first PCR is encountered. It should be noted that the non EMM FIFO buffers are filling while steps 455 through 485 are occurring.

In step 505, it is determined if any of the EMM FIFO buffers contain a complete PES packet. If they do, then the method proceeds to step 515, otherwise step 505 is repeated.

In step 515, a pack for a modified transport stream (see FIG. 4) is constructed with one PES packet from the corresponding non-EMM FIFO buffer. In step 520, the latest converted PCR value (see FIG. 6) is placed in the SCR field of the pack header. In step 525, the stream_id in the pack header is set according to the type of packet (see Table I) and in step 530, other header fields are set appropriately including the program_mux_rate (see FIG. 6). The method then continues to step 535.

In step 535, it is determined if all FIFO buffers have been serviced for the present cycle and if the program stream construction process as a whole is done. If not (no), then the method loops back to step 505. Otherwise, if all FIFO buffers have been serviced and the program stream construction process is completely done (yes), then the method loops back to step 455.

TABLE I

| STREAM ID | STREAM CODING |
| --- | --- |
| 1011 1100 | program_stream_map |
| 1011 1111 | private_stream_2 (For CAT converted to PES) |
| 110x xxxx | ISO/IEC 13818-3 or ISO/IEC 11172-3 audio stream number x xxxx (Set stream number field based on order as located in the PMT) |
| 1110 xxxx | ITU-T Rec. H262 | ISO/IEC 13818-2 or ISO/IEC 11172-2 video stream number xxxx (Set stream number field based on order as located in the PMT) |
| 1111 0000 | ECM_stream |
| 1111 0001 | EMM_stream |
| 1111 1111 | program_stream_directory |

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. An electronic device comprising:
a transport stream analyzer, the transport stream analyzer adapted (i) to receive an encrypted MPEG transport stream and (ii) to output (a) a program stream map stream, (b) a conditional access table stream, (c) a program stream directory stream, (d) an encrypted video signal stream, (e) one or more encrypted audio streams, (f) an entitlement control message stream and (g) a entitlement management message stream, all as individual MPEG packetized elementary stream data structures; and
a packet multiplexer adapted (i) to receive the output of said transport stream analyzer and (ii) to assemble the output of said transport stream analyzer into an encrypted MPEG compliant modified program stream, wherein the encrypted MPEG compliant modified program stream comprises packs of the MPEG packetized elementary stream data structures, and (iii) to output said encrypted MPEG compliant modified program stream.

2. The electronic device of claim 1, further comprising:
FIFO buffers for temporally storing the output of said transport stream analyzer before the output of said transport stream analyzer is received by said packet multiplexer.

3. The electronic device of claim 1, wherein each said pack of said encrypted MPEG compliant modified program stream contains a single MPEG packetized elementary stream packet.

4. The electronic device of claim 3, wherein each MPEG single packetized elementary stream packet contains a single stream type, wherein the stream type is selected from the group consisting of a program stream map (PS map) stream, a conditional access table (CAT) stream, a program stream directory (PS dir) stream, an encrypted video (Video) stream, an encrypted audio (Audio) stream, an entitlement control message (ECM) stream, and an entitlement management message (EMM) stream.

5. The electronic device of claim 1, further comprising:
means for periodically inserting modified values of the program clock reference value taken from fields in said encrypted MPEG transport stream into a system clock reference field of said encrypted MPEG compliant modified program stream.

6. The electronic device of claim 1, further comprising:
means for calculating an average aggregate stream rate value of all said streams and for writing said aggregate stream rate value into a program_mux_rate field in a pack header of each packet of said encrypted MPEG compliant modified program stream.

7. The electronic device of claim 1, wherein said program stream map stream, said conditional access table stream, said program stream directory stream, said encrypted video signal stream, said one or more encrypted audio streams, said entitlement control message stream and said entitlement management message stream comprise a same single program.

8. The electronic device of claim 1, wherein said transport stream analyzer and said packet multiplexer together create the encrypted MPEG compliant modified program stream without decrypting the encrypted transport stream.

9. A receiver for an encrypted MPEG transport stream, comprising:
a transport stream de-multiplexer and decryptor adapted to receive the encrypted MPEG transport stream, said transport stream de-multiplexer and decryptor further adapted to convert said encrypted MPEG transport stream into a first video elementary stream and a first audio elementary stream, said first video elementary stream and said first audio elementary stream being received by an audio and video decoder and presenter, said audio and video decoder and presenter adapted to output a playable signal based on said first video and audio elementary streams;
a program stream constructor adapted to receive the encrypted MPEG transport stream, said program stream constructor further adapted to construct and to output an encrypted MPEG compliant modified program stream from the encrypted MPEG transport stream, said encrypted MPEG compliant modified program stream comprised of packs of individual MPEG packetized elementary stream data structures, wherein the MPEG packetized elementary stream data structures are transformed from (a) a program stream map stream, (b) a conditional access table stream, (c) a program stream directory stream, (d) an encrypted video signal stream, (e) one or more encrypted audio streams, (f) an entitlement control message stream and (g) a entitlement management message stream;

a storage subsystem adapted to store said encrypted MPEG compliant modified program stream; and a program stream de-multiplexer and decryptor adapted to retrieve said encrypted MPEG compliant modified program stream, said program stream de-multiplexer and decryptor further adapted to convert said encrypted MPEG compliant modified program stream into a second video elementary stream and a second audio elementary stream, said second video elementary stream and said second audio elementary stream being received by said audio and video decoder and presenter further adapted to output said playable signal based on said second video and audio elementary streams.

10. The receiver of claim 9, wherein said program stream constructor comprises:

a transport stream analyzer, said transport stream analyzer adapted (i) to receive said encrypted MPEG transport stream and (ii) to output the program stream map stream, the conditional access table stream, the program stream directory stream, the encrypted video signal stream, the one or more encrypted audio streams, the entitlement control message stream and the entitlement management message stream, all based on the encrypted MPEG transport stream and all as individual MPEG packetized elementary stream data structures; and a packet multiplexer adapted (i) to receive the output of said transport stream analyzer and (ii) to assemble the output of said transport stream analyzer into an encrypted MPEG compliant modified program stream, wherein the encrypted MPEG compliant modified program stream comprises the packs of the MPEG packetized elementary stream data structures, and (iii) to output said encrypted MPEG compliant modified program stream.

11. The receiver of claim 10, wherein said program stream constructor further includes FIFO buffers for temporally storing the output of said transport stream analyzer before being received by said packet multiplexer.

12. The receiver of claim 10, wherein each said pack of said encrypted MPEG compliant modified program stream contains a single MPEG packetized elementary stream data structure.

13. The receiver of claim 12, wherein each MPEG single packetized elementary stream packet contains a single stream type, wherein the stream type is selected from the group consisting of a program stream map (PS map) stream, a conditional access table (CAT) stream, a program stream directory (PS dir) stream, an encrypted video (Video) stream, an encrypted audio (Audio) stream, an entitlement control message (ECM) stream, and an entitlement management message (EMM) stream.

14. The receiver of claim 10, wherein said program stream constructor further includes means for periodically inserting modified values of the program clock reference value taken from fields in said encrypted MPEG transport stream into a system clock reference field of said encrypted MPEG compliant modified program stream.

15. The receiver of claim 10, wherein said program stream constructor further includes means for calculating an average aggregate stream rate value of all said streams and for writing said aggregate stream rate value into a program_mux_rate field in a pack header of each packet of said encrypted MPEG compliant modified program stream.

16. The receiver of claim 10, wherein said program stream map stream, said conditional access table stream, said program stream directory stream, said encrypted video signal stream, said one or more encrypted audio streams, said entitlement control message stream and said entitlement management message stream comprise a same single program.

17. The receiver of claim 10, wherein said transport stream analyzer and said packet multiplexer together create the encrypted MPEG compliant modified program stream without decrypting the encrypted transport stream.

18. A method for creating an encrypted MPEG compliant modified program stream comprising:

extracting a program map table from an encrypted MPEG transport stream and creating a program stream map stream in an MPEG packetized elementary stream data structure;

extracting a conditional access table from the encrypted MPEG transport stream and creating a conditional access stream in another MPEG packetized elementary stream data structure;

extracting a program stream directory from the encrypted MPEG transport stream and creating a program stream directory stream in another MPEG packetized elementary stream data structure;

determining the packet IDs of all transport stream packets of a single selected program;

extracting an entitlement management message from the encrypted MPEG transport stream and creating an entitlement management message stream in another MPEG packetized elementary stream data structure;

after creating said entitlement management message stream, extracting and selecting from the encrypted MPEG transport stream video packets, packets from one or more audio channel and an entitlement control message, said video packets, said one or more audio channel packets and said entitlement control message packet having packet IDs belonging to said single selected program and creating respectively from the selected video, audio channel, entitlement control message into an encrypted video stream, one or more encrypted audio channel streams and an entitlement control message stream in respective separate MPEG packetized elementary stream data structures, each MPEG packetized elementary stream data structure containing only one stream type and each audio MPEG packetized elementary stream data structure containing only one audio channel; and assembling packs of the respective MPEG packetized elementary stream data structures of said program stream map stream, said conditional access table stream, said program stream directory, said entitlement management message stream, said encrypted video stream, said encrypted audio channel streams and said entitlement control message stream into an encrypted MPEG compliant modified program stream.

19. The method of claim 18 further including writing a pre-selected value for a stream_id field in the pack header of each packet of said MPEG packetized elementary stream structure, wherein said pre-selected value is different for each stream type.

20. The method of claim 18, further including periodically inserting modified values of a program clock reference value taken from fields in said encrypted MPEG transport stream into a system clock reference field of said encrypted MPEG compliant modified program stream.

21. The method of claim 18, further including calculating an average aggregate stream rate value of all said streams and writing said aggregate stream rate value into a program_mux_rate field in a pack header of each packet of said encrypted MPEG compliant modified program stream.

22. The method of claim 18, wherein said encrypted MPEG compliant modified program stream is created without decrypting the encrypted transport stream.

* * * * *